(12) United States Patent
Shreeve et al.

(10) Patent No.: US 7,486,425 B2
(45) Date of Patent: Feb. 3, 2009

(54) MIRROR DEVICE FOR PROJECTION SYSTEM HAVING PLURALITY OF TILTABLE MIRRORS TILTED

(75) Inventors: Robert W. Shreeve, Corvallis, OR (US); William B. Connors, Corvallis, OR (US); Timothy R Emery, Corvallis, OR (US); George Radominski, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/870,313

(22) Filed: Oct. 10, 2007

(65) Prior Publication Data

US 2008/0037091 A1    Feb. 14, 2008

Related U.S. Application Data

(62) Division of application No. 10/995,690, filed on Nov. 22, 2004, now Pat. No. 7,301,688.

(60) Provisional application No. 60/623,130, filed on Oct. 26, 2004.

(51) Int. Cl.
*G02B 26/08* (2006.01)
*G02B 26/00* (2006.01)

(52) U.S. Cl. .................. 359/198; 359/225; 359/290

(58) Field of Classification Search .............. 359/198, 359/201, 202, 214, 225, 290–292, 295, 298
See application file for complete search history.

(56) References Cited

U.S. PATENT DOCUMENTS

2003/0103047 A1    6/2003    Chiabrera et al.
2006/0012851 A1    1/2006    Wu et al.

*Primary Examiner*—William C Choi

(57) ABSTRACT

A mirror device of one embodiment of the invention is for a projection system corresponding to one of a pixel and a sub-pixel of image data to be projected by the projection system. The mirror device comprises a plurality of tiltable mirrors. The mirrors are cooperatively tilted based on the one of the pixel and the sub-pixel of the image data, to reflect light projected incident thereto in accordance with the one of the pixel and the sub-pixel of the image data.

19 Claims, 5 Drawing Sheets

MIRROR DEVICE FOR PROJECTION SYSTEM HAVING PLURALITY OF TILTABLE MIRRORS TILTED

BACKGROUND

This application is a divisional of 10/995,690 filed Nov. 22, 2004, now U.S. Pat. 7,301,668, which claims the benefit of U.S. Provisional Application No. 60/623,130, filed Oct. 26, 2004, both of which are herebyincorporated by reference.

Projection systems are generally devices that integrate light sources, optics systems, electronics, and spatial light modulators for projecting data such as images, video, documents, and spreadsheets from computers or video devices onto walls or front or rear screens, for large-image viewing. They are especially popular among business users who give presentations as part of their job responsibilities. Newer projectors can weigh as little as a few pounds, making them well suited for business travelers. Projectors are also finding their way into peoples' homes for high-definition television (HDTV) and other home entertainment applications.

Many projection systems work by having spatial light modulators that are mirror devices, such as digital mirror devices (DMD's). The mirror devices correspond to the pixels or sub-pixels of image data to be projected by the projection systems. Each mirror device includes one tiltable mirror. The mirror tilts at very high frequency, sometimes more than 10,000 times in a single second, in order to properly display its corresponding pixel or sub-pixel of image data. However, achieving high tilting frequencies for the mirrors of mirror devices can be difficult to accomplish.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part thereof, and in which is shown by way of illustration specific exemplary embodiments in which the invention may be practiced. These embodiments are described in sufficient detail to enable those skilled in the art to practice the invention. Other embodiments may be utilized, and logical, mechanical, electrical, electro-optical, software/firmware and other changes may be made without departing from the spirit or scope of the present invention. The following detailed description is, therefore, not to be taken in a limiting sense, and the scope of the present invention is defined only by the appended claims.

Mirror Device with Tiltable Mirrors

Figure 1A:
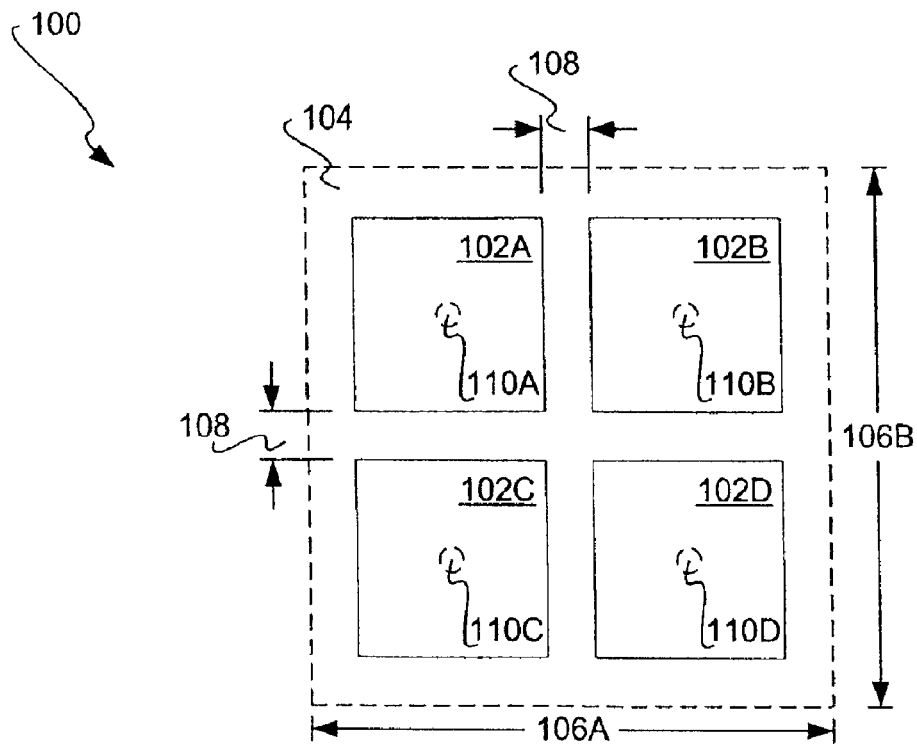
FIGS. 1A and 1B are a top-view diagram and a front-view diagram, respectively, of a mirror device having a number of tiltable mirrors, according to an embodiment of the invention.
Figure 1B:
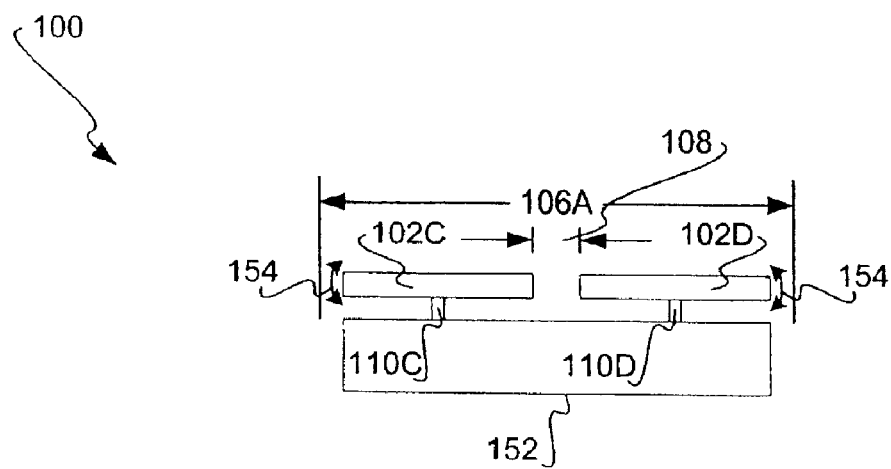

FIGS. 1A and 1B show a top view and a front view, respectively, of a mirror device 100, according to an embodiment of the invention. The mirror device 100 corresponds to a pixel or a sub-pixel of image data to be projected by a projection system, by the mirror device 100 reflecting light projected incident to the mirror device 100 in accordance with the pixel or the sub-pixel. Where the mirror device 100 corresponds to a sub-pixel of the image data, the sub-pixel may be, for instance, a green sub-pixel, a red sub-pixel, or a blue sub-pixel.

The mirror device 100 includes four tiltable mirrors 102A, 102B, 102C, and 102D, collectively referred to as the mirrors 102. The tiltable mirrors 102 are tilted in accordance with the pixel or the sub-pixel to which the mirror device 100 corresponds. As shown in FIG. 1A, the four tiltable mirrors 102 are organized in a two row-by-two column configuration. There may be more or less than four tiltable mirrors 102, however. For example, there may be nine tiltable mirrors 102 organized in a three row-by-three column configuration. More generally, there are at least two tiltable mirrors 102, which can be organized in a rectangular grid having M rows and N columns, where M and N may be equal or unequal to one another. The four tiltable mirrors 102 may as a whole be referred to as the reflecting mechanism of the mirror device 100. The mirrors 102 are mirrors in that they have reflective surfaces that reflect light projected incident thereto. The mirrors 102 may further be referred to as reflective units.

Those of the tiltable mirrors 102 of the mirror device 100 that are adjacent to one another are separated from one another via spacings, or gaps, 108, which are also referred to as interstitial spacings or gaps. The spacings 108 in one embodiment are less than the one half of the wavelength of the light projected incident to the tiltable mirrors 102. Furthermore, the size of the tiltable mirrors 102 in total is substantially equal to an area 104 associated with the pixel or the sub-pixel to which the mirror device 100 corresponds. That is, the surface area of all of the tiltable mirrors 102 is substantially equal to the area 104, which is associated with the pixel or the sub-pixel to which the mirror device 100 corresponds. This area 104 has a first dimension 106A and a second dimension 106B, where the product of the dimensions 106A and 106B is equal to the area 104. The size of the mirrors 102 in total is substantially equal to the size of the area 104, as opposed to being identical to the area 104, because of the spacings 108 between adjacent of the mirrors 102. That is, the size of the mirrors 102 in total is slightly less than the size of the area 104, owing to the presence of the spacings 108.

The tiltable mirrors 102A, 102B, 102C, and 102D of the mirror device 100 tilt due to their being positioned on hinges, or posts, 110A, 110B, 110C, and 110D, respectively, which are collectively referred to as the hinges 110. As depicted in FIG. 1B specifically with respect to the hinges 110C and 110D and the mirrors 102C and 102D, the hinges 110 tiltably situate the tiltable mirrors 102 onto a substrate 152. Thus, the ends of the tiltable mirrors 102 tilt towards or away from the substrate 152, as indicated by the arrows 154.

By having a number of tiltable mirrors 102 corresponding to a pixel or a sub-pixel, and that have a size in total that is substantially equal to and occupying the area 104 that is associated with this pixel or sub-pixel, instead of having a larger, single mirror having a size or surface area substantially equal to and occupying the area 104 associated with the pixel or sub-pixel, a number of advantages are realized. First, the tiltable mirrors 102 are able to tilt at a frequency greater than a larger, single mirror that has a size substantially equal to the area 104 is able to. For example, although embodiments of the invention are amenable to implementation with respect to non-fluidic mirror devices, where the mirror device 100 is a fluidic mirror device, less fluid has to be displaced by each of the mirrors 102 during tilting, resulting in greater tilting frequencies. Fluidic mirror devices are those that have fluid between the mirrors 102 and the substrate 152, surrounding the hinges 110, whereas non-fluid mirror devices do not have any such fluid. Even with non-fluidic mirror devices, tilting frequencies are greater with the number of tiltable mirrors 102 substantially occupying the area 104, than if a single mirror were to occupy the area 104.

Furthermore, the tiltable mirrors 102 are able to tilt at an angle greater than a larger, single mirror that has a size substantially equal to the area 104 would be able to. This is because, where the hinges 110 have the same height as a hinge for a larger, single mirror, the smaller size of the tiltable mirrors 102 allows them to tilt higher than a larger, single mirror can. The larger the mirror, the smaller the tilting angle, because the end of the mirror that is being tilted downward will make contact with the substrate 152 at a smaller angle than a smaller mirror would. That is, larger mirrors "bottom out" at smaller tilting angles than smaller mirrors do.

For example, a single larger mirror that substantially occupies the area 104 corresponding to a pixel or a sub-pixel of the image data to be projected may have a tilting frequency of 400 Hertz (Hz), and have a normalized reference tilting angle of X. Having the four tiltable mirrors 102 instead occupy the same area 104, with 0.1 micron spacing between adjacent mirrors, can result in a tilting frequency of 2,000 Hz, with a tilting angle of 2X. Having nine of the tiltable mirrors 102 instead occupy the same area 104, again with 0.1 micron spacing between adjacent mirrors, can result in a tilting frequency of ~4,000 Hz, with a tilting angle of 3X. Thus, tilting frequency and tilting angles are increased by having a number of smaller mirrors occupy the area 104, in lieu of a single larger mirror.

Furthermore, the employment of a number of smaller mirrors having a size in total substantially equal to the area 104 has been empirically found to result in better overall contrast of the projection of the pixel or the sub-pixel of the image data with which the area 104 is associated and to which the mirror device 100 corresponds. For example, the greatest contrast achieved with a single larger mirror that substantially occupies the area 104 may have a normalized contrast value of C. By comparison, where four of the tiltable mirrors 102 instead occupy the same area 104, a contrast value of ~20 C may be able to be achieved in at least some situations, or a contrast that is twenty times greater than if a single larger mirror were used. Where nine of the tiltable mirrors 102 instead occupy the same area 104, a contrast value of ~15 C may be achieve, or a contrast that is about fifteen times greater than if a single larger mirror were used. The increase in contrast by a value of about twenty times with four tiltable mirrors, and the increase in contrast by a value of about just fifteen times with the nine tiltable mirrors was empirically determined. It is believed that the decrease in contrast from using nine tiltable mirrors as opposed to four tiltable mirrors may result from the increase in the number of gaps between the mirrors. It is noted that the improvements in contrast are with respect to the mirror device 100 itself, and may not ultimately result in the image being projected from the projection system.

In addition, in one embodiment of the invention the tiltable mirrors 102 of the mirror device 100 tilt in unison, in accordance with the pixel or sub-pixel to which the mirror device 100 corresponds. The mirrors 102 may tilt in unison in the same direction, or in different directions. Furthermore, the mirrors 102 may tilt in unison at the same angle, or at different angles. The tiltable mirrors 102 may also tilt in unison at the same time, or with a delay between tilting of different of the mirrors 102.

In another embodiment of the invention, however, the tiltable mirrors 102 of the mirror device 100 do not tilt in unison. Thus, depending on the pixel or sub-pixel to which the mirror device 100 corresponds, only a portion of the mirrors 102 may be tilted. For example, for a pixel to be displayed with maximum intensity, or brightness, all of the mirrors 102 may be tilted to achieve such maximum intensity or brightness, whereas for a pixel to be displayed with less than maximum intensity or brightness, only a portion of the mirrors 102 may need to be tilted to achieve such intensity or brightness.

In either of these embodiments of the invention, the tiltable mirrors 102 of the mirror device 100 tilt cooperatively, in that the number of the mirrors 102 that tilt is based on the pixel or the sub-pixel to which the mirror device 100 corresponds, such that this same pixel or sub-pixel controls tilting of all of the mirrors 102. Therefore, the tiltable mirrors 102 are not independent of one another, since tilting of each of the tiltable mirrors 102 is each based on the same pixel or sub-pixel to which the mirror device 100 corresponds. In other words, the tiltable mirrors 102 are not independent mirrors in the sense that all of the tiltable mirrors 102 correspond to the same pixel or sub-pixel to which the mirror device 100 corresponds.

Mirror Mechanism having Number of Mirror Devices

Figure 2:
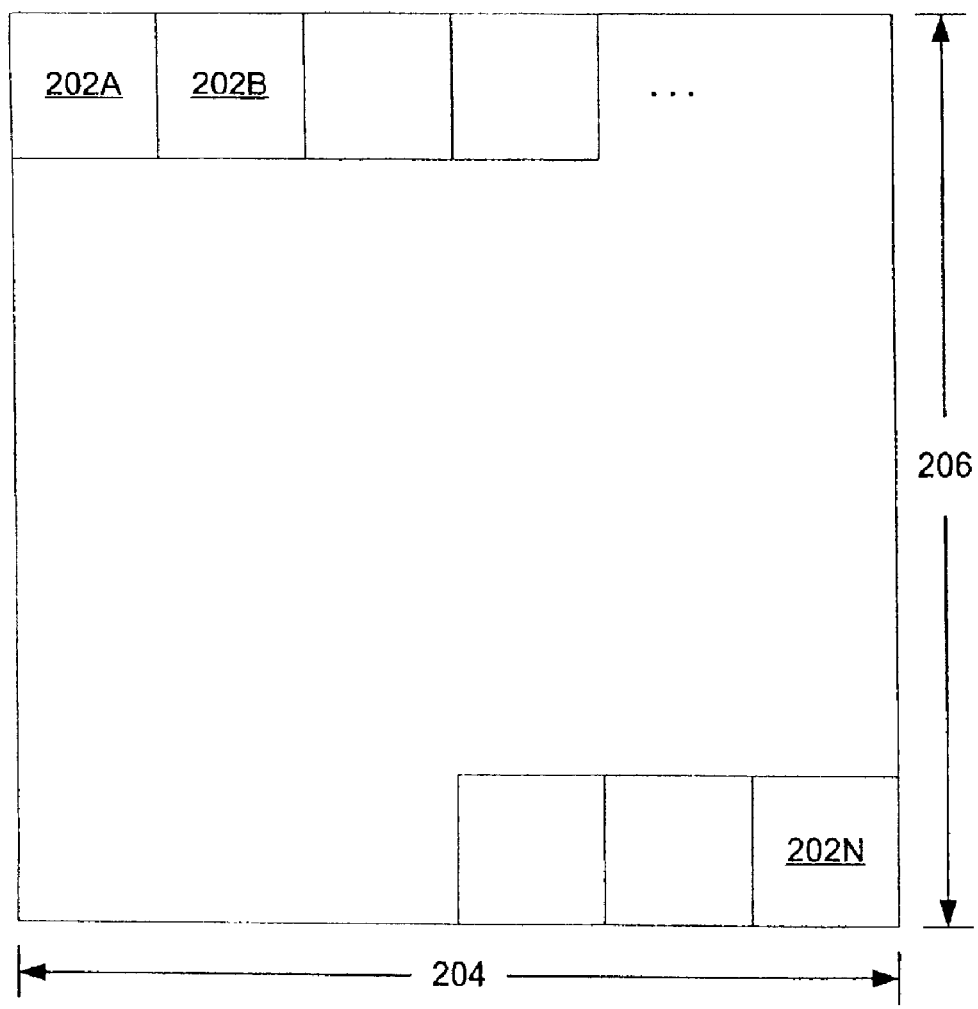
FIG. 2 is a diagram of a mirror mechanism having a number of mirror devices, according to an embodiment of the invention.

The mirror device 100 that has been described corresponds to a single pixel or sub-pixel of image data to be projected by a projection system of which the mirror device 100 is a part. To implement such a projection system, more than one such mirror device 100 is typically needed. Therefore, FIG. 2 shows a mirror mechanism 200, having a number of mirror devices 202A, 202B, . . . , 202N, collectively referred to as the mirror devices 202, according to an embodiment of the invention. The mirror mechanism 200 may be fabricated as a single integrated circuit (IC) or as a micro-electromechanical (MEM) device, in one embodiment of the invention.

Each of the mirror devices 202 may be implemented as an instance of the mirror device 100. The mirror devices 202 of the mirror mechanism 200 are organized into columns 204 and rows 206. The number of columns 204 and rows 206 may be based on the resolution of the projection system with which the mirror mechanism 200 is to be used. For instance, an SVGA resolution is 800 rows by 600 columns, an XGA resolution is 1,204 rows by 768 columns, and so on. Other resolutions, such as other standard 4:3 resolutions as well as widescreen 16:9 resolutions, can be achieved.

The number of the mirror devices 202 within the mirror mechanism 200 may be equal to the number of pixels of the resolution of the projection system, or the number of sub-pixels of the resolution of the projection system. For instance, the mirror mechanism 200 may have a sufficient number of the mirror devices 202 to render all of the pixels of the resolution of the projection system, where each of the mirror devices 202 is responsible for all of the sub-pixels of a corresponding pixel. A rotatable color wheel or other mechanism may then be used to reflect differently colored light onto each of the mirror devices 202 in one embodiment, so that each mirror device can process all of the sub-pixels of the pixel for which the mirror device is responsible.

Alternatively, the number of the mirror devices 202 of the mirror mechanism 200 may be equal to the number of pixels of the resolution of the projection system, but the mirror mechanism 200 may be responsible for only one type of sub-pixel of the pixels. For instance, the mirror devices 202 of the mirror mechanism 200 may be responsible only for the red sub-pixels of the pixels, where there are two additional mirror mechanisms to handle the green sub-pixels and the blue sub-pixels. Alternatively still, there may be a sufficient number of the mirror devices 202 within the mirror mechanism 200 to handle all of the sub-pixels of the pixels of the resolution of the projection system. For instance, if the resolution of the projection system is SVGA, then there is at least 800 times 600 times 3 of the mirror devices 202, one for each of the red, green, and blue sub-pixels for each of the pixels of the SVGA resolution.

Mirror Driving

Figure 3:
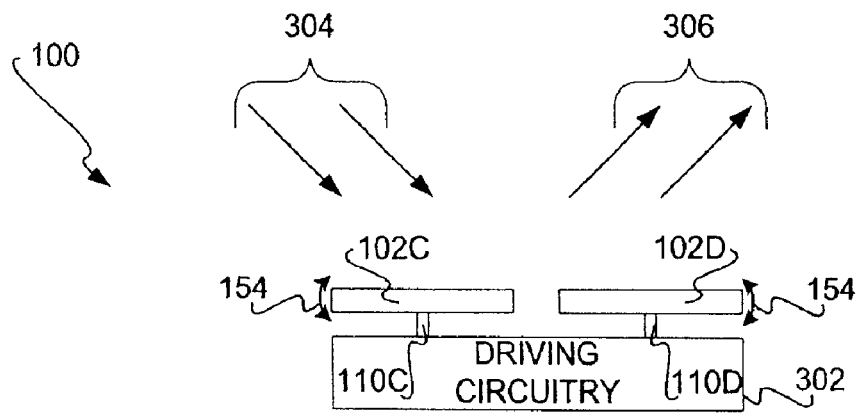
FIG. 3 is a diagram depicting how the mirrors of a mirror device can be controlled by driving circuitry for the mirror device, according to an embodiment of the invention.

FIG. 3 shows how the tiltable mirrors 102 of the mirror device 100 can be driven using driving circuitry particularly for the device 100, according to an embodiment of the invention. The mirror device 100 thus includes driving circuitry 302. That the tiltable mirrors 102 of the mirror device 100 are driven using the driving circuitry 302 means that driving circuitry 302 appropriately charges or otherwise controls the tiltable mirrors 102 so that the tiltable mirrors 102 tilt in accordance with the pixel or sub-pixel of the image data to be projected to which the mirror device 100 corresponds. The driving circuitry 302 thus can act as the substrate 152 of FIG. 1B in this embodiment. The driving circuitry contains the necessary electronic devices to cause the tiltable mirrors 102 to tilt based on the pixel or sub-pixel of the image to be projected.

The tilting of the tiltable mirrors 102 on the hinges 110, as indicated by the arrows 154 and as controlled by the driving circuitry 302, affects, or modulates, light 304 that is projected incident to the mirrors 102. Thus, the reflected light 306 resulting from the light 304 being reflected by the tiltable mirrors 102 varies based on how much, or whether, the tiltable mirrors 102 have been tilted. The reflected light 306 is the rendering of the pixel or sub-pixel to which the mirror device 100 corresponds. It is noted that there can be driving circuitry 302 for each instance of the mirror device 100. That is, the driving circuitry 302 can be part of the mirror device 100, such that each instance of the mirror device 100 has its own driving circuitry 302.

Figure 4:
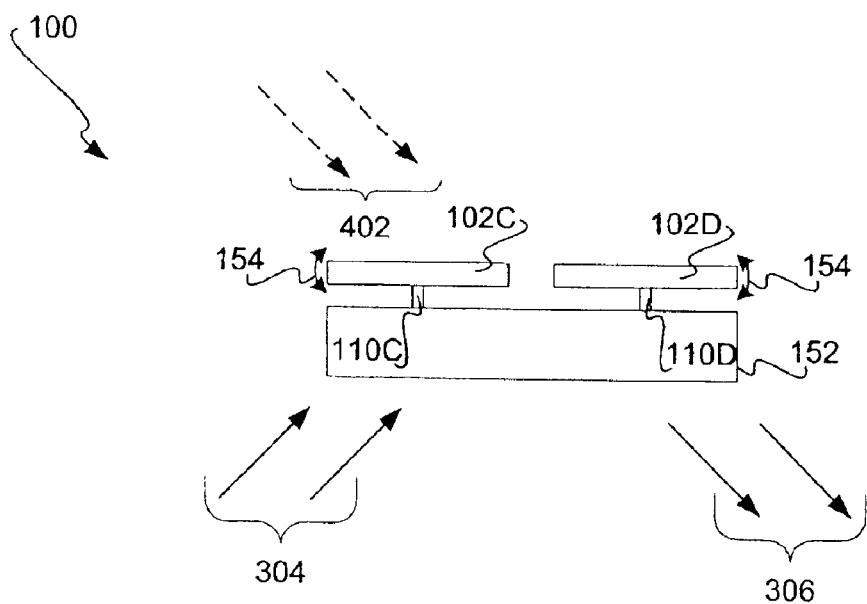
FIG. 4 is a diagram depicting how the mirrors of a mirror device can be controlled by an externally generated beam, according to an embodiment of the invention.

FIG. 4 shows the tiltable mirrors 102 of the mirror device 100 can be externally driven using an external beam 402, according to an embodiment of the invention. The beam 402 may be an electron beam or another type of focused beam. Depending on the quantity of the charge of the beam 402, the tiltable mirrors 102 retain an amount of charge that causes them to tilt on their hinges 110, as indicated by the arrows 154. For instance, the substrate 152 may have a particular charge, such that charging the tiltable mirrors 102 causes the mirrors 102 to attract towards or repel away from the tiltable mirrors 102. Thus, the tiltable mirrors 102 are charged in accordance with the pixel or subpixel of the image data to be projected to which the mirror device 102 corresponds.

As before, the light 304 that is projected incident to the tiltable mirrors 102 is modulated by the tilting of the tiltable mirrors. Thus, the reflected light 306 that results from the light 304 being reflected by the tiltable mirrors 102 varies based on how much, or whether, the tiltable mirrors 102 have been tilted, and the reflected light 306 is the rendering of the pixel or sub-pixel to which the mirror device 100 corresponds in one embodiment, the manner by which the beam 402 is used to charge the tiltable mirrors 102 of the mirror device 100 is as described in the copending and coassigned patent application entitled "MEM Devices Having Charge Induced via Focused Beam to Enter Different States," filed on Dec. 21, 2003, and assigned Ser. No. 10/743,603. Furthermore, the light 304 is depicted in FIG. 4 as being projected towards the bottom of the tiltable mirrors 102, such that the reflected light 306 is reflected away from the bottom of the tiltable mirrors 102. In this embodiment, then, the substrate 152 is at least substantially transparent. In a different embodiment, however, the light 304 may be projected towards the top of the mirrors 102, as in FIG. 3, such that the light 304 is reflected away from the top of the mirrors 102.

Having the beam 402 as the driving mechanism that causes the tiltable mirrors 102 of the mirror device 100 to tilt allows advantageously for easily achieved individual control of the tilting of the mirrors 102. For example, the beam 402 may be directed towards only a portion of the mirrors 102, such as only one or more of the mirrors 102 and not all of the mirrors 102, such that only these mirrors are tilted. Other of the mirrors 102 which are not subjected to the beam 402 therefore are not tilted.

Projection System

Figure 5:
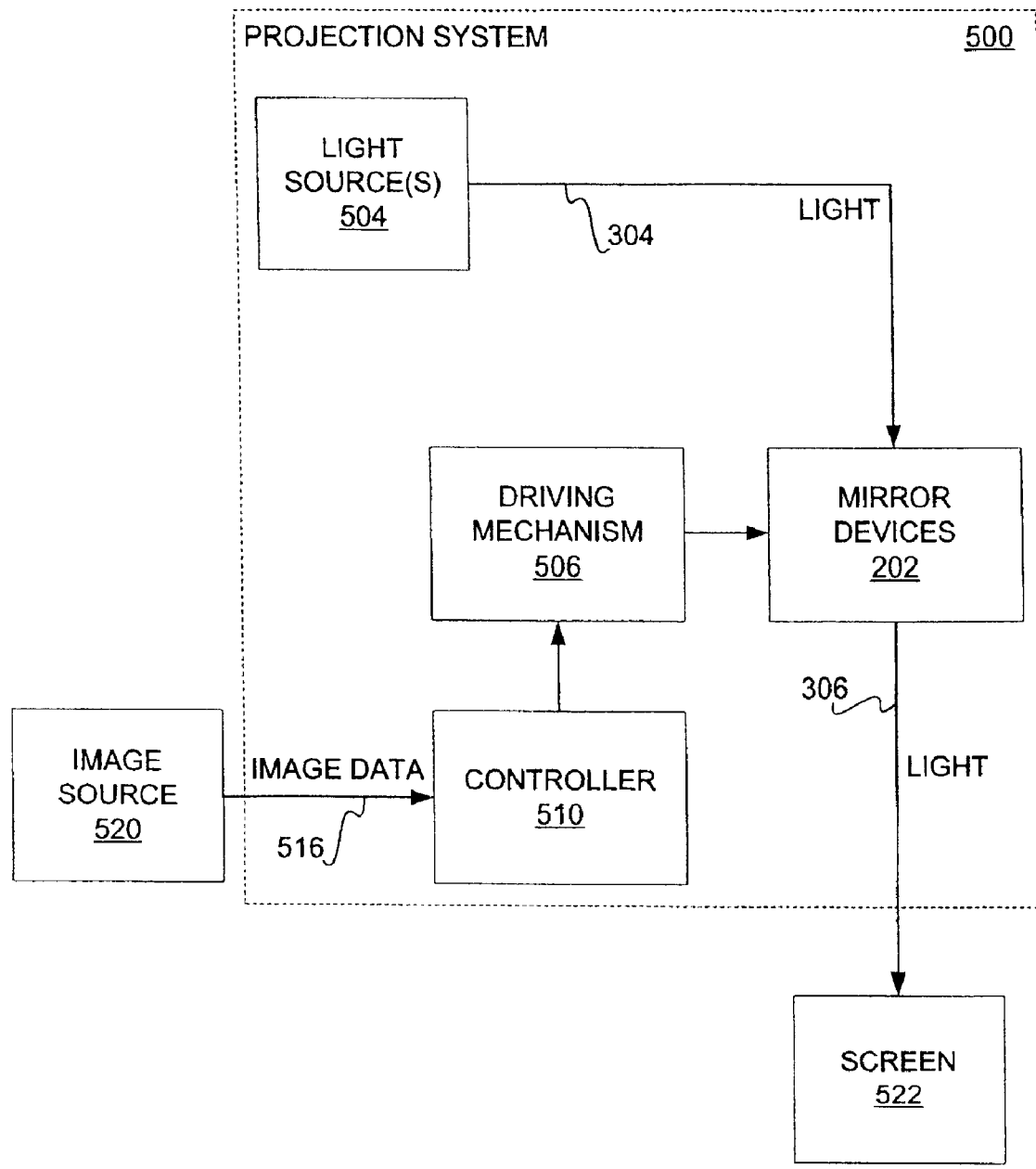
FIG. 5 is a diagram of a projection system, according to an embodiment of the invention.

FIG. 5 shows a block diagram of a projection system 500 according to an embodiment of the invention. The system 500 may be implemented as a projector. As can be appreciated by those of ordinary skill within the art, the system 500 includes components specific to a particular embodiment of the invention, but may include other components in addition to or in lieu of the components depicted in FIG. 5. For instance, the projection system 500 typically includes various types of optics, but such optics are not shown in FIG. 5. The projection system 500 includes one or more light sources 504 and mirror devices 202. The system 500 also includes a driving mechanism 506, a controller 510, and is operatively or otherwise coupled to an image source 520 to receive image data 516, as well as a screen 522.

The light sources 504 output the light 304, such as white light. Each of the light sources 504 may be an ultra high pressure (UHP) mercury vapor arc lamp, or another type of light source. For instance, the light sources may be other types of light bulbs, as well as other types of light sources such as light-emitting diodes (LED's), and so on. The light output by the light sources 504 is for ultimate modulation, reflection, and/or projection by the mirror devices 202.

The controller 510 may be implemented in hardware, software, or a combination of hardware and software. The controller 510 receives image data 516 from an image source 520. The image source 520 may be a computing device, such as a computer, or another type of electronic and/or video device. The controller 510 controls the mirror devices 202 in accordance with the image data 516, through the driving mechanism 506. The image data 516 is divided or dividable into a number of pixels, such that each of the mirror devices 202 corresponds to one such pixel or one or more sub-pixels of one such pixel, and the devices 202 are controlled by the controller 510 on a pixel-by-pixel basis.

The driving mechanism 506 may in one embodiment be driving circuitry, such as instances of the driving circuitry 302 of FIG. 3 that has been described. In such an embodiment, the driving mechanism 506 may be part of the mirror devices 202 themselves. In another embodiment, the driving mechanism 506 may be external to the mirror devices 202. For instance, the driving mechanism 506 may include a beam source that generates a focused beam to scan the mirror devices 202, as has been described in relation to FIG. 4.

Each of the mirror devices 202 may be an instance of the mirror device 100 that has been described. In sum, the mirror devices 202 may be part of one or more instances of the mirror mechanism 200 of FIG. 2, in one embodiment. The driving mechanism 506 thus tilts the tiltable mirrors of each of the mirror devices 202 based on the pixel or sub-pixel of the image data 516 to which the mirror device in question corresponds. The controller 510 therefore controls the driving mechanism 506 in accordance with the image data 516 that is received from the image source 520.

The mirror devices 202 modulate, or reflect, the light output by the light sources 504 in accordance with the image data 516 as controlled by the controller 510. The image data 516 may be a still image or a moving image, for instance. The resulting light 306 is projected externally or outward from the projection system 500, where it is displayed on the screen 522, or another physical object, such as a wall, and so on. The screen 522 may be a front screen or a rear screen, such that the projection system 500 may be a front-projection system or a rear-projection system, as can be appreciated by those of ordinary skill within the art. The user of the projection system 500, and other individuals able to see the screen 522, are then able to view the image data 516.

Methods

Figure 6:
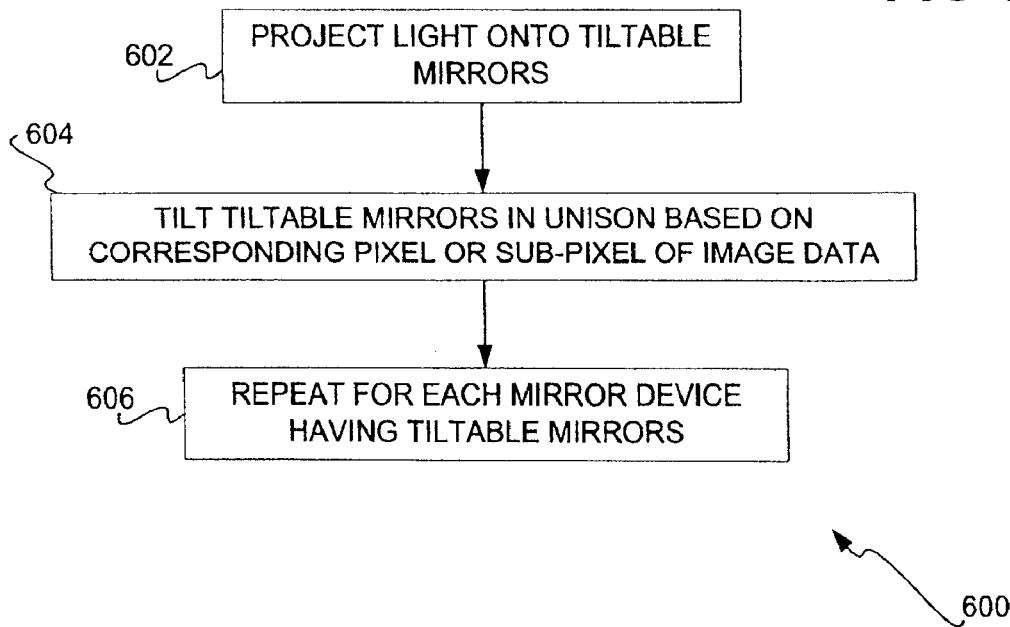
FIG. 6 is a flowchart of a method of use, according to an embodiment of the invention.

FIG. 6 shows a method of use 600 for the mirror device 100 that has been described, according to an embodiment of the invention. The light 304 is projected onto the tiltable mirrors 102 of the mirror device 100 (602), where the mirror device 100 corresponds to a pixel or a sub-pixel of the image data 516 to be projected. The tiltable mirrors 102 are tilted based on this pixel or sub-pixel (604). For instance, the controller 510 controls the driving mechanism 506 for the tiltable mirrors 102 so that the mirrors 102 are appropriately tilted in accordance with the pixel or sub-pixel to which the mirror device 100 corresponds. That is, the mirrors 102 are tilted by driving the mirrors 102, by either electronically driving circuitry for the mirrors 102, by scanning a focused beam over the mirrors 102, or by another approach. The method 600 is repeated for each of a number of other mirror devices (606), such as each of the mirror devices 202 of the mirror mechanism 200, where each other mirror device is an instance of the mirror device 100, having tiltable mirrors 102, and corresponding to a different pixel or sub-pixel of the image data 516.

Figure 7:
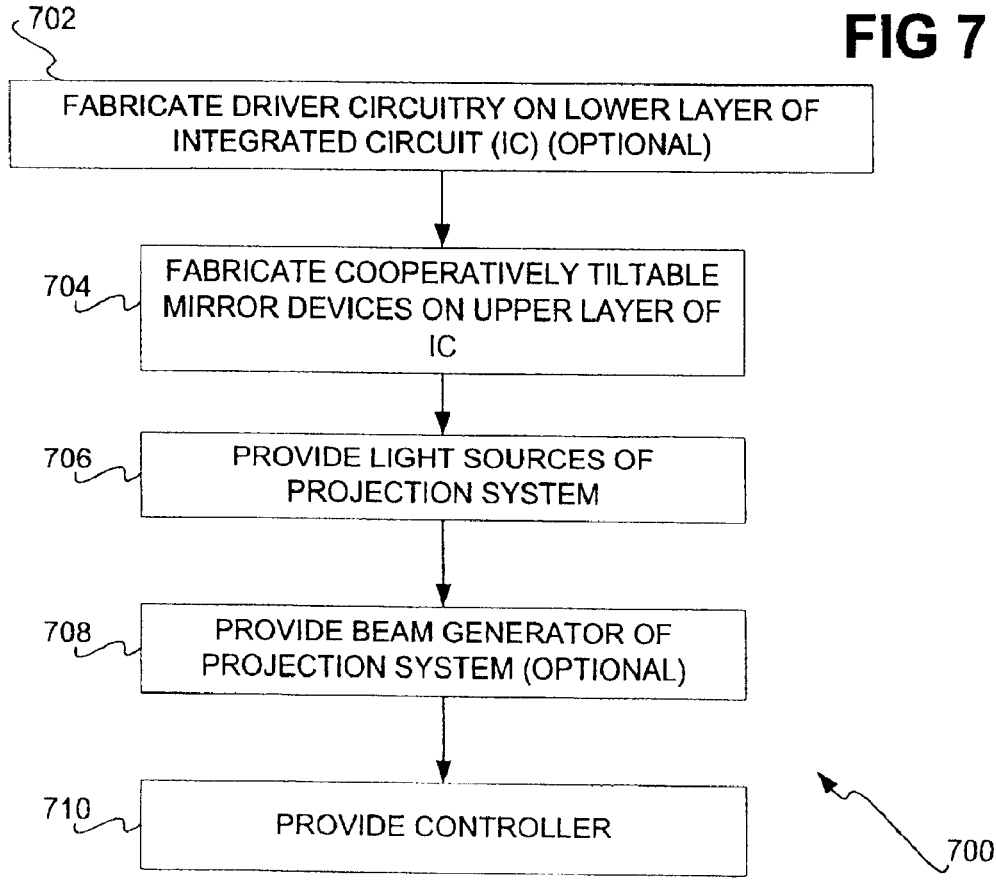
FIG. 7 is a flowchart of a rudimentary method of manufacture, according to an embodiment of the invention.

FIG. 7 shows a rudimentary method of manufacture 700 for the mirror mechanism 200 as well as for the projection system 500 that have been described, according to an embodiment of the invention. Where the tiltable mirrors of the mirror devices 202 are driven by driving circuitry, such driving circuitry for each of a number of such mirror devices may be photolithographically or otherwise fabricated on a lower layer of an integrated circuit (IC) (702), where the IC is an implementation of the mirror mechanism 200. The mirror devices 202 themselves may then be photolithographically or otherwise fabricated on an upper layer of the IC (704). Because the tiltable mirrors of a mirror device can be individually smaller in size than the driving circuitry that drives all of the tiltable mirrors for a single mirror device, the feature size, such as the critical dimensions (CD's), of the lower layer of the IC can be larger than that of the upper layer of the IC. Thus, less precise semiconductor manufacturing equipment may be employed to fabricate the lower layer of the IC as compared to the upper layer of the IC.

If the projection system 500 is being fabricated, of which the IC is a part, then the light sources 504 are provided (706). If the driving mechanism 506 is not individual driving circuitry for each mirror device, but rather is a beam generator that generates a focused beam to scan over all the mirror devices, then such a beam generator for the projection system 500 may also be provided (708). Finally, the controller of the projection system 500 is provided (710), to control the driving mechanism 506 of the mirror devices 202.

CONCLUSION

It is noted that, although specific embodiments have been illustrated and described herein, it will be appreciated by those of ordinary skill in the art that any arrangement is calculated to achieve the same purpose may be substituted for the specific embodiments shown. This application is intended to cover any adaptations or variations of the present invention. Therefore, it is manifestly intended that this invention be limited only by the claims and equivalents thereof.

We claim:

1. A mirror device for a projection system corresponding to one of a pixel and a sub-pixel of image data to be projected by the projection system and comprising:

a reflecting mechanism to reflect light projected incident thereto in accordance with one of pixel and sub-pixel of image data, such that contrast is achieved that is greater than contrast achieved when a single mirror is used to reflect the light for the one of the pixel and the sub-pixel of the image data, wherein the reflecting mechanism comprises a plurality of tiltable mirrors that are tilted, the mirror device driven by a beam of the projection system scanning the mirror device to tilt the plurality of tiltable mirrors.

2. The mirror device of claim 1, wherein the reflecting mechanism comprises a plurality of reflective units, adjacent of which are separated by a spacing less than one half of a wavelength of the light projected incident thereto.

3. A mirror mechanism for a projection system comprising:

a plurality of mirror devices, each mirror device corresponding to one of a pixel and a sub-pixel of image data to be projected by the projection system and having a plurality of tiltable mirrors that are tilted, wherein the plurality of tiltable mirrors of each mirror device has in total a size substantially equal to an area associated with the one of the pixel and the sub-pixel to which the mirror device corresponds, the plurality of tiltable mirrors of the mirror device tilted at a frequency greater than a tilting frequency of and at an angle greater than a tilting angle of a single mirror having a size substantially equal the area associated with the one of the pixel and the sub-pixel.

4. The mirror mechanism of claim 3, wherein adjacent of the plurality of tiltable mirrors are separated by a spacing less than one half of a wavelength of the light projected incident thereto.

5. The mirror mechanism of claim 3, further comprising, for each mirror device, driving circuitry to tilt the plurality of tiltable mirrors of the mirror device based on the one of the pixel and the sub-pixel to which the mirror device corresponds.

6. The mirror mechanism of claim 3, wherein the plurality of mirror devices are externally driven.

7. The mirror mechanism of claim 6, wherein the plurality of mirror devices are externally driven by a beam scanning the plurality of mirror devices to tilt the plurality of tiltable mirrors thereof.

8. The mirror mechanism of claim 3, wherein the mirror mechanism is fabricated as one of a micro-electromechanical (MEM) device and an integrated circuit (IC) including the plurality of mirror devices.

9. A projection system comprising:
   a plurality of mirror devices, each mirror device corresponding to one of a pixel and a sub-pixel of image data to be projected by the projection system and having a plurality of tiltable mirrors that are tilted; and,
   a driving mechanism to cooperatively tilt the plurality of tiltable mirrors of each mirror device based on the one of the pixel and the sub-pixel to which the mirror device corresponds,
   wherein the driving mechanism comprises a beam source generating a beam to scan the plurality of mirror devices to tilt the plurality of tiltable mirrors thereof.

10. The projection system of claim 9, further comprising a light source projecting light incident to the plurality of mirror devices, wherein adjacent of the plurality of tiltable mirrors are separated by a spacing less than one half of a wavelength of the light projected incident thereto.

11. The projection system of claim 9, wherein the plurality of tiltable mirrors of each mirror device has in total a size substantially equal to an area associated with the one of the pixel and the sub-pixel to which the mirror device corresponds, the plurality of tiltable mirrors of the mirror device tilted at a frequency greater than a tilting frequency of and at an angle greater than a tilting angle of a single mirror having a size substantially equal to the area associated with the one of the pixel and the sub-pixel.

12. The projection system of claim 9, wherein the driving mechanism comprises electronic circuitry for each of the plurality of mirror devices.

13. A projection system comprising:
   means for reflecting light in accordance with one of a pixel and a sub-pixel of image data to be projected and for achieving contrast greater than contrast achieved when a single mirror is used to reflect the light; and,
   means for controlling the means for reflecting in accordance with the one of the pixel and the sub-pixel of the image data,
   wherein the means for reflecting light comprises a plurality of tiltable mirrors that are tilted,
   and wherein the plurality of tiltable mirrors has in total a size substantially equal to an area associated with the one of the pixel and the sub-pixel, the plurality of tiltable mirrors tilted at a frequency greater than a tilting frequency of and at an angle greater than a tilting angle of a single mirror having a size substantially equal the area associated with the one of the pixel and the sub-pixel.

14. The projection system of claim 13, further comprising means for generating the light reflected by the means for reflecting.

15. The projection system of claim 13, wherein the means for reflecting light has one or more interstitial spacings, each interstitial spacing less than one half of a wavelength of light incident to the means for reflecting.

16. A method comprising:
   fabricating a plurality of mirror devices on a layer of a mirror mechanism, each mirror device based on one of a pixel and a sub-pixel of image data and having a plurality of tiltable mirrors cooperatively tilted; and
   providing a beam generator to generate a beam to scan the plurality of tiltable mirrors of each mirror device to cause the plurality of tiltable mirrors of each mirror device to tilt.

17. The method of claim 16, farther comprising fabricating driver circuitry for each mirror device on a lower layer of the mirror mechanism, the driver circuitry for each mirror device to cause the plurality of tiltable mirrors to tilt.

18. The method of claim 17, wherein the layer on which the mirror devices is fabricated has a semiconductor feature size smaller than a semiconductor feature size of the lower layer on which the driver circuitry is fabricated.

19. The method of claim , wherein the mirror mechanism is part of a projection system, the method farther comprising providing one or more light sources of the projection system.

* * * * *

UNITED STATES PATENT AND TRADEMARK OFFICE
CERTIFICATE OF CORRECTION

PATENT NO.         : 7,486,425 B2                                                Page 1 of 1
APPLICATION NO.    : 11/870313
DATED              : February 3, 2009
INVENTOR(S)        : Robert W. Shreeve et al.

It is certified that error appears in the above-identified patent and that said Letters Patent is hereby corrected as shown below:

In column 10, line 24, in Claim 16, delete "and" and insert -- and, --, therefor.

In column 10, line 29, in Claim 17, delete "farther" and insert -- further --, therefor.

In column 10, line 37, in Claim 19, delete "claim" and insert -- claim 16 --, therefor.

In column 10, line 38, in Claim 19, delete "farther" and insert -- further --, therefor.

Signed and Sealed this

Seventh Day of July, 2009

JOHN DOLL
*Acting Director of the United States Patent and Trademark Office*